May 6, 1941.  G. W. HAMPE ET AL  2,240,772
MEANS AND METHOD FOR HEATING CONDUCTORS
Filed Sept. 12, 1938
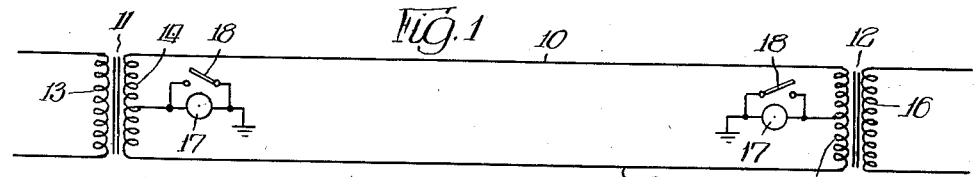
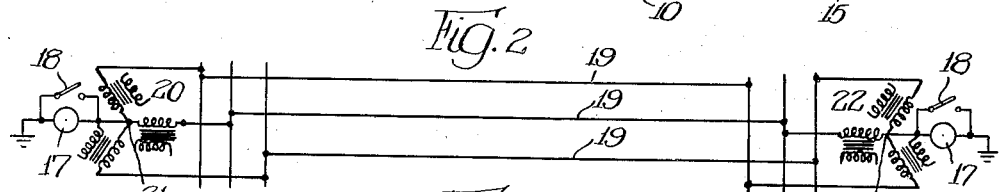
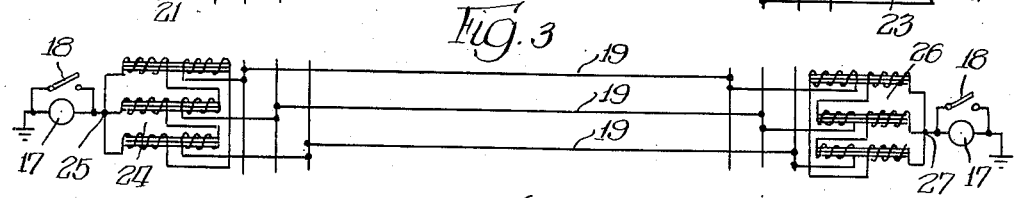
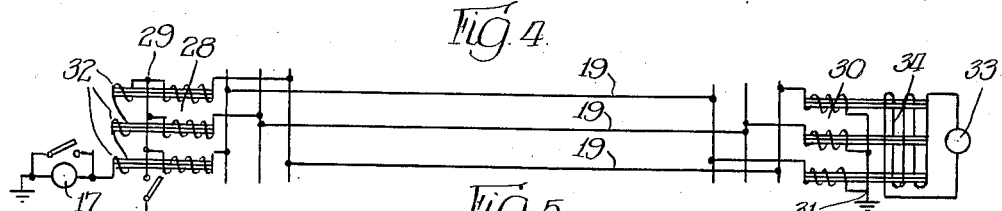
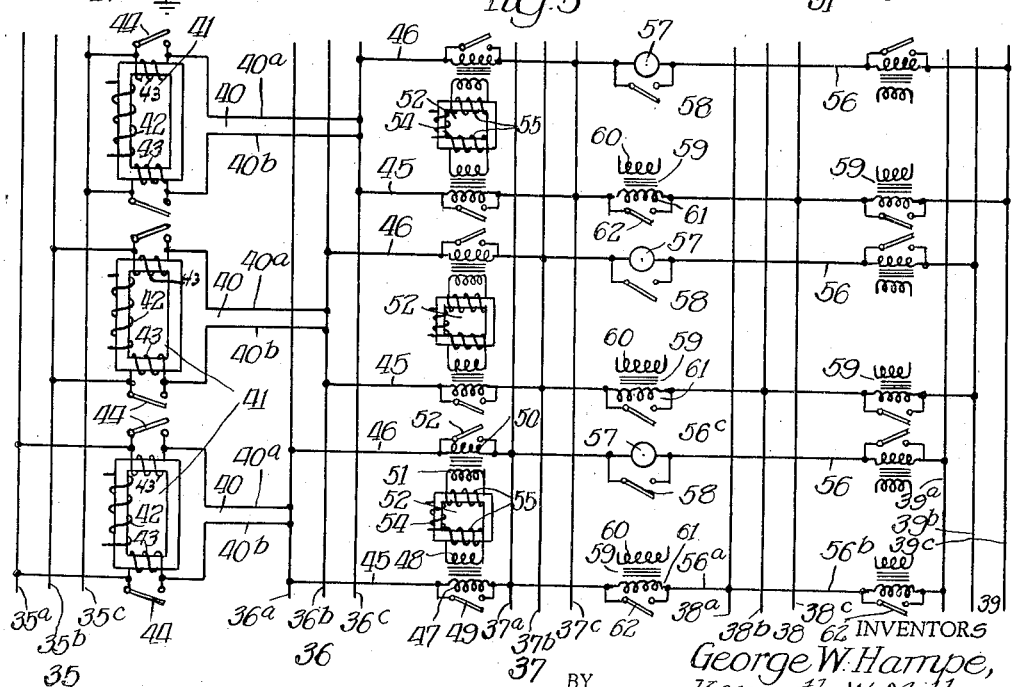
INVENTORS
George W. Hampe,
Kenneth W. Miller,
BY Wilkinson, Huxley, Byron & Knight
ATTORNEY.

Patented May 6, 1941

2,240,772

UNITED STATES PATENT OFFICE 2,240,772

MEANS AND METHOD FOR HEATING CONDUCTORS

George W. Hampe and Kenneth W. Miller, Chicago, Ill.; said Miller assignor to said Hampe Application September 12, 1938, Serial No. 229,406

5 Claims. (Cl. 171—97)

The present invention relates to means and methods for heating conductors.

When energy is supplied to distant points over electrical conductors, the losses in the transmission line vary with the loads transmitted and are in general detrimental to the efficiency of transmission. In certain cases it is desirable to heat the transmission lines and to have such heating supplementary to or independent of the heating caused by the load current losses. Such heating of transmitting lines is useful for the prevention of ice formation on overhead lines and for melting ice which has already formed, and also for the prevention of voids in the insulation of cables under varying transmitted loads.

The present invention has the advantage that the heating currents which are applied jointly with the load currents or independently are self-compensating, so that the magnetic disturbances which they would otherwise tend to produce in the terminal apparatus are eliminated or minimized.

An object of the present invention is to provide simple means and a simple method for heating the conductors of electrical transmission lines.

A further object is to provide heating means and methods applicable to electrical transmission conductors which are not only simple in operation but present no interference with the load currents.

Further objects will appear as the description proceeds.

Referring to the drawing—

Figure 1 is a simplified diagram showing a direct current source for directing heating current over a single phase transmission line;

Figure 2 shows a direct current source for directing current over a polyphase line, illustrated as a three-phase line, said direct current source being associated with a star-connected bank of transformers;

Figure 3 is a view similar to Figure 2 but showing the direct current source cooperatively associated with a zigzag connection of transformers;

Figure 4 is a view somewhat similar to Figure 2 but showing the application of windings for magnetically opposing the windings of the star-connected bank of transformers; and Figure 5 represents a system in which the heating or auxiliary current may be traced through loops or meshes in a single polarity or phase.

Referring first to Figure 1, the numerals 10—10 indicate conductors connected at one end to the transformer 11 and at another point to the transformer 12. Said conductors 10—10 constitute branches of a single phase circuit. Said transformer 11 is provided with the primary winding 13 and the secondary winding 14. The transformer 12 is provided with the primary winding 15 and the secondary winding 16. Connected to a mid point of the winding 14 of the transformer 11 is the source of direct current 17, the opposite terminal of which is connected to ground. Bridged across the source 17 is the switch 18. Similarly connected to the winding 15 of the transformer 12 is another direct current source 17, the opposite terminal of which is connected to ground and which is bridged by the switch 18.

According to the embodiment of the invention illustrated in Figure 1, direct current from the source 17 may be said to pass to the mid point of the transformer winding 14, thence over the two conductors 10—10 in parallel, to the winding 15 of the transformer 12. From the mid point of the winding 15 of the transformer 12 said current may be said to pass through the right-hand source 17 to ground. It will be understood that in some cases it may not be necessary to provide the two sources 17 and that a direct connection from the mid point of either winding may be had direct to ground by closing of the corresponding switch 18. When the two sources 17 are used at different stations they will usually be of such polarity that they will aid each other in circulating current over the line. If the line represented by the conductors 10—10 is only a portion of a larger transmission system, this polarity relationship might not always hold true.

Referring to Figure 2, the numerals 19—19—19 represent three conductors, or branches, of a three-phase system. At the station represented at the left-hand side of the figure said conductors 19—19—19 are connected to the transformer 20, the windings of which are star-connected, having the neutral point 21. At the station represented at the right-hand side of Figure 2 the conductors 19 are connected to the transformer 22. The windings of the transformer 22 are also star-connected and they have the neutral point 23. A direct current source 17 is connected between the neutral point 21 and ground, and said source is bridged by the switch 18. Likewise, the neutral point 23 of the transformer 22 is connected through a direct current source 17 to ground, and said direct current source is bridged by the switch 18.

In the embodiment of the present invention illustrated in Figure 3 the conductors or branches 19—19—19 are connected, at the station represented at the left-hand side of said figure, to the transformer 24. Said conductors 19 are connected to the transformer 24, the windings of which have the well known zigzag connection. Said transformer 24 is provided with the neutral point 25. The conductors 19—19—19, at the station shown at the right-hand side of said figure, are connected to the transformer 26, the windings of which have the well known zigzag connection. The transformer 26 is provided with the neutral point 27. Each of the neutral points 25 and 26 is connected to ground through the direct current source 17 which is bridged by the switch 18.

The construction illustrated in Figure 3 has the advantage that the auxiliary or heating current set up by the source or sources 17 will be magnetically self-neutralizing.

In the system illustrated in Figure 4 the conductors or branches 19—19—19 of a polyphase circuit are connected, at the station indicated at the left-hand side of said figure, to the transformer 28, the connection between said conductors 19 and the windings of the transformer 28 being the well known star connection. Said transformer 28 is provided with the neutral point 29. Likewise, at the station represented at the right-hand side of Figure 4 the conductors 19—19—19 are connected to the transformer 30 in a star connection, the neutral point being indicated by the numeral 31. At the station at the left-hand end of Figure 4 a direct current source 17 is provided, having one of its terminals connected to ground and having the other of its terminals connected to the neutral point 29 through the de-magnetizing windings 32—32—32, which de-magnetizing windings neutralize the effect of the auxiliary or heating current directed along the system by the direct current source 17. At the station illustrated at the right-hand side of Figure 4 the neutral point 31 is connected directly to ground. A direct current source 33 is provided which has its terminals connected to the terminals of a loop 34 adapted to direct demagnetizing current to neutralize the effect of the heating current passed through the windings of the transformer 30.

The construction illustrated in Figure 4 has the advantage that in a star connection of transformer windings the direct current heating current may be directed in parallel over the conductors of the system, but the added magnetizing effect of such heating current will be neutralized by the de-magnetizing windings 32, as illustrated at the left-hand side of Figure 4, or by the de-magnetizing loop 34, as illustrated at the right-hand side of Figure 4.

Referring now to Figure 5, an embodiment of the present invention is illustrated in which an auxiliary or heating current may be applied to each phase or polarity of an electrical conducting system.

The numerals 35a, 35b and 35c indicate the bus bars at a station 35; the numerals 36a, 36b and 36c indicate the bus bars at a station 36; the numerals 37a, 37b and 37c indicate the bus bars at a station 37; the numerals 38a, 38b and 38c indicate the bus bars at another station 38; and the numerals 39a, 39b and 39c indicate the bus bars of still another station 39. The bus bar 35a of station 35 is connected to the corresponding bus bar 36a of station 36 by means of the conductor 40, which comprises the two branches 40a and 40b.

A similar conductor comprising the parallel branches 40a and 40b, connects bus bar 35b with bus bar 36b, and another similar conductor 40, comprising the parallel branches 40a and 40b, connects bus bar 35c with bus bar 36c. Each of the conductors 40 has cooperatively associated therewith the transformer 41. Each of said transformers is provided with a primary winding 42, which may be excited from any preferred source. Each of said transformers is provided with a pair of secondary windings 43—43, which are connected in circuit with the branches 40a and 40b. Each of the secondary windings 43 is bridged by a switch 44. According to the construction thus far described in connection with Figure 5, a heating current may be induced in the secondary windings 43—43 to be directed in series between corresponding bus bars from station 35 to station 36 and return. Load currents flowing in parallel through the branches 40a and 40b will set up opposing magnetomotive forces by means of the windings 43—43.

The connections between the stations 36 and 37 embody the present invention in a system where such stations are connected by paralleled lines, which are spaced apart physically a considerable distance. The bus bar 36a of station 36 is connected to the bus bar 37a of station 37 by means of the two parallel conductors 45 and 46. Likewise, the bus bar 36b of station 36 is connected to the bus bar 37b of station 37 by similar conductors 45 and 46. Likewise, bus bar 36c of station 36 is connected to bus bar 37c of station 37 by similar parallel conductors 45 and 46. Each of the conductors 45 is provided with the transformer winding 47, which has associated therewith the corresponding transformer winding 48. Said transformer winding 47 may be bridged by the switch 49. Likewise, each conductor 46 is provided with the transformer winding 50, which has cooperatively associated therewith the transformer winding 51. Said transformer winding 50 may be bridged by the switch 52. The numeral 53 indicates a transformer provided with the primary winding 54, which may be excited by any preferred source. Said transformer 53 is provided with the secondary windings 55—55, which are connected to the transformer windings 48 and 51.

According to the illustrated embodiment of the invention as applied to the connections between stations 36 and 37, it will be noted that a heating current may be induced in the transformer windings 47 and 50 by the application of current from said preferred source to the corresponding primary winding 54. The heating currents induced in the transformer windings 47 and 50 will pass in series between stations 36 and 37 and return.

Referring now to the connections between stations 37, 38 and 39, said stations are looped together. Bus bar 37a of station 37 is connected to bus bar 38a of station 38 by means of conductor 56a. Said bus bar 38a of station 38 is connected to bus bar 39a of station 39 by means of the conductor 56b. Said bus bar 39a of station 39 is connected to bus bar 37a of station 37 by means of conductor 56c. Said three conductors 56a, 56b and 56c combine to form a continuous series conductor which may be indicated by the numeral 56. Bus bar 37b of station 37 is connected to bus bar 38b of station 38 and bus bar 39b of station 39 by a similar conductor 56 made up of the portions in series 56a, 56b and 56c. Likewise, bus bar 37c of station 37 is connected to bus bar 38c of station 38 and with bus bar 39c of station 39 by means of a conductor 56 made up of the portions in series 56a, 56b and 56c.

Figure 5 shows two alternative means for directing heat or auxiliary current through the conductors 56, one being a direct current source 57, which may be bridged by the switch 58. Said direct current source 57 is connected in series in each of the conductors 56 and is adapted to direct a heating current in series through said conductor, which conductor, in its function of carrying load current, provides paths, one branch of which is embodied in the conductors 56a and 56b and the other branch of which is embodied in the conductor 56c.

Figure 5 also shows an alternating current source for directing a heating current through each conductor 56. For this purpose each conductor 56 is provided with one or more transformers 59 each having a primary winding 60, which may be excited from any preferred source. Said transformer 59 is provided with a secondary winding 61 bridged by the switch 62. It will be understood that the heating current induced in the secondary winding 61 will flow in a series circuit through the conductor 56, which conductor, as explained above, in its function of carrying load current, provides a plurality of paths, one leg of which is embodied in the conductors 56a and 56b and the other leg of which is embodied in the conductor 56c. A plurality of transformers 59 are illustrated in the various portions of each conductor 56, which transformers will aid each other in directing the heating current through the conductor 56.

Though certain preferred embodiments of the present invention have been described in detail, many modifications will occur to those skilled in the art. It is intended to cover all such modifications that fall within the scope of the appended claims.

What is claimed is:

1. In an alternating current transmission system, in combination, a plurality of conductors, transformer windings connected to said conductors at their opposite ends to form a star connection at each end, each of said star connections having a neutral point, a source of heating current connected between one of said neutral points and ground, the other of said neutral points being connected to ground, and de-magnetizing windings opposing certain of said transformer windings for carrying current from said source of electromotive force through said conductors in parallel.

2. In a power transmission system, in combination, a plurality of conductors, transformer windings at the opposite ends of said conductors for forming a zigzag connection at each end to complete an alternating current system, each of said zigzag connections being provided with a neutral point, a source of heating current connected between ground and one of said neutral points, the other of said neutral points being connected to ground, said transformer windings at each end of said system being connected to set up mutually opposing magnetizing effects due to flow of current from said source of electromotive force.

3. In a power transmission system, in combination, a plurality of conductors, transformer windings at the opposite ends of said conductors for forming a star connection at each end to complete an alternating current system, each of said star connections being provided with a neutral point, a source of heating current connected between ground and one of said neutral points, the other of said neutral points being connected to ground, and de-magnetizing windings in circuit with said source adapted to oppose the magnetizing effect of said transformer windings at at least one end of said system.

4. In a power transmission system, in combination, a plurality of conductors, transformer windings at the opposite ends of said conductors for forming a star connection at each end to complete an alternating current system, each of said star connections being provided with a neutral point, a source of heating current connected between ground and one of said neutral points, the other of said neutral points being connected to ground, de-magnetizing windings in circuit with said source adapted to oppose the magnetizing effect of said transformer windings at at least one end of said system, and de-magnetizing windings cooperatively associated with the transformer windings at said other end for neutralizing the magnetizing effect of current set up by said source of electromotive force.

5. In a power transmitting system, in combination, bus bars at spaced stations, a conductor connecting like bus bars at said spaced stations, said conductor comprising a pair of branches adapted to operate in parallel for carrying load current, transformer means having a pair of windings each located in one of said branches, said windings being connected to set up opposing magnetomotive forces due to load current flowing in parallel through said branches, and means for inducing electromotive forces in said transformer windings which are additive to set up a heating current in series through said branches.

GEORGE W. HAMPE.
KENNETH W. MILLER.